United States Patent [19]

Heynau et al.

[11] 4,209,255
[45] Jun. 24, 1980

[54] SINGLE SOURCE AIMING POINT LOCATOR

[75] Inventors: Hans A. Heynau, Norwalk; Peter E. Raber, Milford, both of Conn.

[73] Assignee: United Technologies Corporation, Hartford, Conn.

[21] Appl. No.: 25,648

[22] Filed: Mar. 30, 1979

[51] Int. Cl.$^2$ ............................................. G01B 11/26
[52] U.S. Cl. .............................. 356/152; 250/203 R; 340/707; 340/709; 358/93
[58] Field of Search ..................... 250/203 R, 203 CT; 356/141, 152; 340/707, 709; 358/93, 107

[56] References Cited

U.S. PATENT DOCUMENTS

| | | | |
|---|---|---|---|
| 3,641,351 | 2/1972 | Hintringer et al. | 250/203 R |
| 3,735,395 | 5/1973 | Iwabuchi et al. | 340/707 |
| 3,861,807 | 1/1975 | Lescrenier | 356/152 |
| 3,885,096 | 5/1975 | Inuiya et al. | 340/709 |
| 3,917,412 | 11/1975 | Stoutmeyer et al. | 356/152 |
| 4,109,145 | 8/1978 | Graf | 250/203 R |
| 4,111,555 | 9/1978 | Ellis | 356/152 |
| 4,150,285 | 4/1979 | Brienza et al. | 250/203 R |

Primary Examiner—S. C. Buczinski
Attorney, Agent, or Firm—Richard P. Lange

[57] ABSTRACT

An aiming point locating system has a single LED mounted on the helmet of a pilot in an aircraft and can be used to designate a point on a cockpit display, or the like, without touching the display. An optical device located in front of the LED tapers the energy pattern from the LED so that a sufficiently varying energy field reaches photodiodes located adjacent the display. The photodiodes are oriented toward the pilot so that they respond directly to the tapered energy field thus allowing greater accuracy in electrically identifying the pilot's aiming point on the display. A two stage switch actuated by the pilot has a partially depressed stage causing a visible aiming reticle to appear on display and a fully depressed stage activating the emitter to obtain an electrical output from the photodiodes. Monopulse processing of the signals from the photodiodes is used to create varying X-Y signals which directly correspond to the coordinates of the point on the display viewed by the pilot.

11 Claims, 7 Drawing Figures

AIMING POINT BETWEEN
DETECTOR PAIR

SINGLE SOURCE AIMING POINT LOCATOR

The Government has rights in this invention pursuant to Contract No. F33657-77-C-0202 awarded by the Department of Defense, United States Air Force.

BACKGROUND OF THE INVENTION

1. Field of the Invention

This invention relates to an aiming point locating system and, more particularly to a system for identifying the point on a cockpit display, or the like, viewed by a pilot.

2. Description of the Prior Art

A number of visual responsive systems have been proposed which incorporate emitters and sensors mounted either on the pilot's helmet or in the cockpit so that the line of sight of the pilot can be tracked in order to preclude the necessity of identifying a particular situs by hand. One such system is disclosed in U.S. Pat. No. 3,971,412 issued Nov. 4, 1975 to Stoutmeyer et al for ADVANCED HELMET TRACKER USING LATERAL PHOTODETECTION AND LIGHT-EMITTING DIODES. In this system two light emitters are mounted on the helmet of the pilot while two photodetectors are mounted at spaced locations within the cockpit of the aircraft. The emitters are positioned such that they define a line parallel to the pilot's line of sight and the pilot's line of sight is determined by measuring the intersection of the planes formed by each emitter together with the two detectors. Ideally the system has four light emitting diodes, two of which are mounted on each side of the pilot's helmet. Four detectors mounted in the cockpit are directed toward the pilot's helmet so as to have intersecting fields of view no matter the position of the pilot's head. A problem with this particular system is that at least two emitters must be mounted on the pilot's helmet which add to overall helmet weight and increase the complexity of electrical connections and the like.

Another similar system is disclosed in U.S. Pat. No. 3,678,283 issued July 18, 1972 to LaBaw for RADIATION SENSITIVE OPTICAL TRACKER. A photodetector assembly capable of identifying location is positioned on the helmet of the pilot while two light emitters are mounted in the cockpit. This apparatus serves to measure the amount of roll of the pilot's helmet, a second assembly consisting of a light emitter disposed on the helmet of the pilot together with another photodiode positioned in the cockpit measures the angle of the pilot's sight in the remaining plane to measure the location of the helmet. A disadvantage of this particular system is that two emitters are required to obtain an electrical output signal indicating the pilot's line of sight. Another disadvantage of this particular system is that the photodiodes required for operation are relatively expensive and complicated to manufacture.

Other oculometer systems which are capable of producing electrical signals indicative of the direction an operator is looking include U.S. Pat. No. 4,109,145 issued Aug. 22, 1978 to Graf for APPARATUS BEING CONTROLLED BY MOVEMENT OF THE EYE.

Another prior art system which may be of interest is that disclosed in U.S. patent application Ser. No. 864,956 filed Dec. 27, 1977 by Brienza et al for REMOTE OPTICAL DISPLAY DESIGNATOR assigned to the same assignee as the present invention. This system employs a remote source of energy in a handheld or helmet mounted unit to generate an identifying beam on the faceplate of a CRT through which an image is being displayed. The diffusing medium deposited on the rear of the CRT faceplate scatters the incident beam to orthogonal pairs of photodetectors located adjacent the edges of the faceplate. A disadvantage of this system is that the display device must be of the type which includes a diffusing medium for scattering the impinging energy from the source. Accordingly, the system does not work well with display devices which do not include a diffusing medium, i.e. plasma panels, some liquid crystal displays, light emitting diode displays, and the like, in that the electromagnetic energy reaching the photo pickups would not be sufficient for proper operation. In addition, many cathode ray tubes have curved faceplates and scattered light, particularly from points near the edges of the CRT, must travel through the entire length of this curved pathway, often by secondary scatter, to the photo pickups adjacent the edges of the faceplate. Accordingly, the inherent attenuation significantly reduces the intensity of the energy finally reaching the photo pickups.

SUMMARY OF THE INVENTION

It is a primary object of the present invention to provide an aiming point locating system for use in the cockpit of an aircraft, or the like, in which a simple lightweight device mounted on a pilot's helmet can be used to identify the point on a display being observed.

According to the present invention, a single source of electromagnetic energy together with an optical device for tapering the energy pattern out of the source are positioned on the helmet of a pilot. Photo pickups mounted in the cockpit of an aircraft adjacent to a display respond to the tapered energy pattern and create an electrical output signal to identify the coordinates of the point on the display being observed by the pilot. Another device on the pilot's helmet creates a sighting image so that the pilot can readily identify the aiming point.

A particular feature of the present invention is that an optical device disposed in front of a source of electromagnetic energy positioned on the helmet of a pilot tapers the energy pattern presented to photodiodes located adjacent a display, or the like, in the cockpit of an aircraft. The energy pattern can be tapered in either intensity or area, or in a combination of intensity and area. A number of embodiments for such a tapered energy distribution are shown.

These and other objects, features and advantages of the present invention will be more apparent in light of the following detailed description.

BRIEF DESCRIPTION OF THE DRAWING

FIG. 1 is a perspective view illustrating a single source aiming point locator according to the present invention mounted on the helmet of a pilot for viewing a cockpit display or the like;

DETAILED DESCRIPTION OF THE ILLUSTRATED EMBODIMENT

Figure 1:
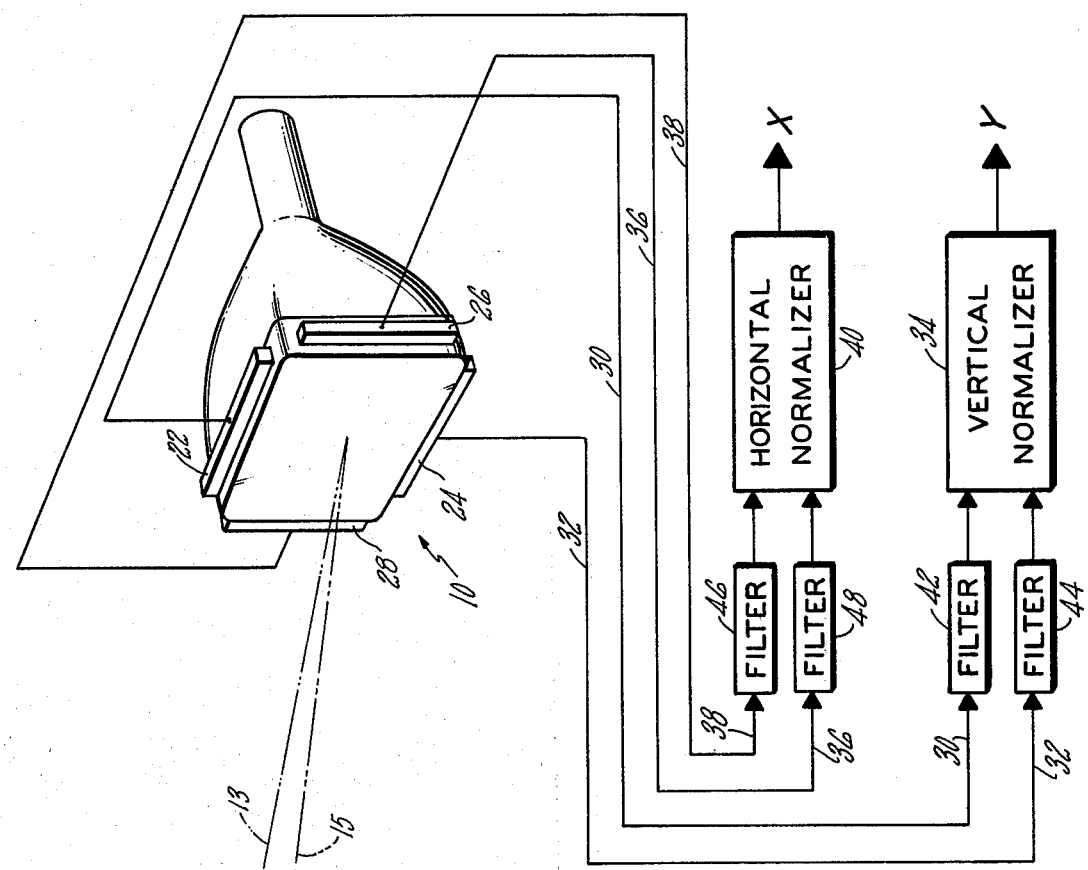
Figure 1:
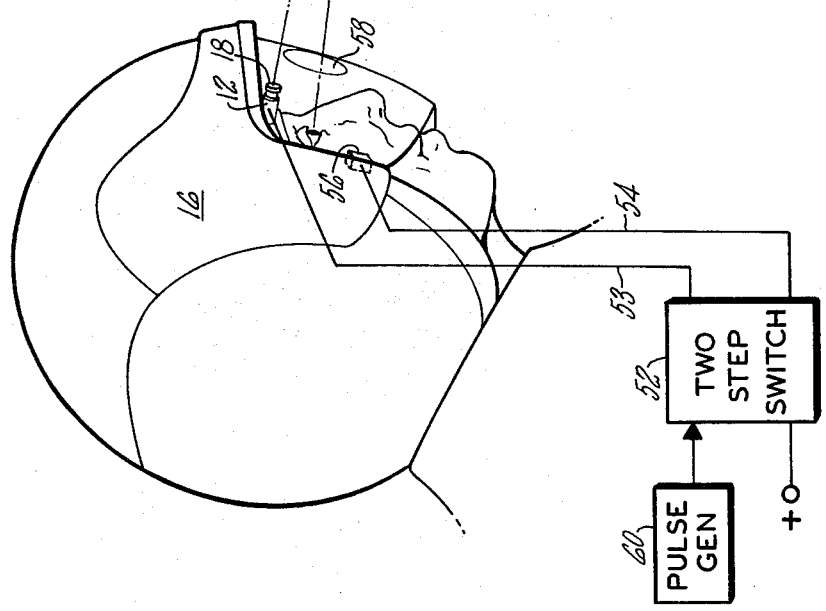

Referring initially to FIG. 1, a pilot is illustrated viewing a particular location on a display 10 which may be a visual readout from a radar system or the like. The display 10 might be mounted on the control panel within the cockpit of an aircraft which is not shown in that it is not part of the present invention. The aiming point locator according to the present invention includes an emitter 12 which is mounted on the helmet 16 so that it can direct energy generally in the same direction as the pilot's line of sight. An optical device 18, described hereinafter, is positioned in front of the emitter 12 so that the beam of electromagnetic energy from the emitter passes therethrough to the display 10. The optical device 18 tapers the energy pattern presented to the display 10 to enhance detection accuracy, a number of different embodiments for this energy taper are disclosed hereinafter.

In the illustrated embodiment two pairs of photoresponsive elements, such as photodiodes 22, 24 and 26, 28, are positioned on the control panel of the aircraft conveniently adjacent the faceplate of the display 10. While in FIG. 1, the diodes are shown as linear diodes arranged in an orthogonal configuration, it should be understood that the smaller circularly shaped photodiodes could also be used with some of the tapered energy patterns. In addition, rather than four diodes in an orthogonal configuration, three diodes could also be used. As is known, photodiodes are responsive to the electromagnetic energy impinging thereon and have electrical output signals whose magnitude varies in proportion to the received electromagnetic energy. The photodiodes 22 and 24 are connected, via lines 30 and 32 respectively, to the inputs of a vertical normalizer 34. In a similar manner, the output of the photodiodes 26 and 28 are connected, via lines 36 and 38 respectively, to the input of a horizontal normalizer 40. Electrical filters 42 and 44 are coupled in the lines 30 and 32 respectively, to filter the input signal presented to the vertical normalizer 34 while electrical filters 46 and 48 are coupled in the lines 36 and 38, respectively, to filter the input signals presented to the horizontal normalizer 40. The outputs from the normalizers can be, for example, the radar processing device in the aircraft for directing a weapon at the target identified by the pilot (not shown).

Still referring to FIG. 1, also located in the cockpit of the aircraft is a switch 52 which is positioned at a location which can be conveniently reached by the pilot's hand, one such location being on the handle of the control stick. The switch 52 may be a two-step switch that includes a button which has a partially depressed stage and a fully depressed stage. If the aiming reticle is of the holographic type, the switch 52 is connected by a line 54 to a suitable light source 56 positioned on the helmet 16 of the pilot such that it illuminates a holographic recording material 58 positioned, for example, on the visor of the helmet 16. As a result, when the control button (not shown) is moved to its partially depressed stage, the light source 56 is connected with a source of operating potential and an aiming reticle will be visible to a pilot at the plane of the display 10. The switch 52 is also connected by a line 53 to the emitter 12, and when the control button of the switch 52 is fully depressed, pulse generator 60 is connected to the emitter 12 which directs a beam of electromagnetic energy along an axis 13 that intersects the reticle axis 15 at the plane of the display 10. The frequency of the pulse generator 60 is matched with the bandpass characteristics of the filters 42, 44, and 46, 48, which are connected in the inputs of the normalizer circuits so that the normalizer circuits only respond to energy from the emitter 12 when the switch 52 is fully depressed.

Figure 2:
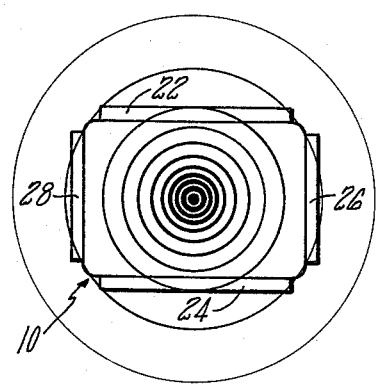
FIG. 2 is an enlarged view of just the photo pickups adjacent the display as shown in FIG. 1 and it shows one embodiment of the tapered energy patterns, the tapered intensity circle.

A particular feature of the present invention is that the optical device 18 tapers the energy pattern directed toward the display device 10 in a manner that enhances the accuracy of electrically identifying the pilot's point of observation. The tapered energy patterns are sized and shaped that there is a sufficient amount of electromagnetic energy, having adequately varying intensity, impinging on each pair of photodiodes, no matter what point the pilot is viewing, to create an electrical signal out of the normalizers which follows precisely any changes in the coordinates viewed by the pilot for use as an input to other systems in the aircraft. Referring now to FIGS. 2–5, four embodiments of different energy taper pattern are illustrated. FIG. 2 shows just the display device 10 with the photodiode located adjacent thereto and depicts a cross section of the intensity of the beam of electromagnetic energy directed toward the display device 10. As is seen, the beam is essentially symmetric and circular with the highest point of intensity being at the center which would coincide with the reticle observed by the pilot. The intensity of the energy decreases at a rate which is approximately the same in all radial directions. The useable beam diameter is preferably equal to, or greater than, twice the distance between the diodes.

Figure 3:
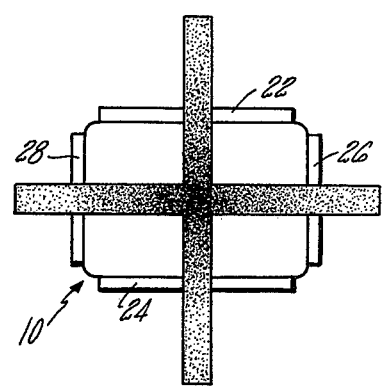
FIG. 3 is similar to FIG. 2 but depicts a second embodiment for a tapered energy pattern,, this being a tapered intensity cross.

A second embodiment of a tapered energy pattern for the optical device 18 is illustrated in FIG. 3. This cross pattern has arms which are of essentially a constant area while the intensity of the beam varies from the center to the edge of the cross. The point of greatest intensity is at the center of the pattern where the two arms cross and the intensity variation is similar in all four arms in a radially outward direction. The lengths of each of the arms are preferably equal to or greater than twice the distance between the diodes. For example, if the diodes are separated by a distance of seven inches wide and five inches high, then the length of the horizontal arms should be approximately fourteen inches wide while the vertical arms are approximately ten inches high. This ensures that the photodiodes receive a sufficient amount of light no matter what point is being viewed by the pilot.

Figure 4:
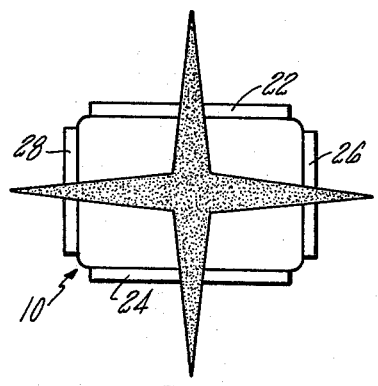
FIG. 4 is also similar to FIG. 2 but illustrates a third embodiment for a tapered energy pattern, this embodiment being a tapered area cross with constant intensity.

Next, referring to FIG. 4 there is seen a third embodiment of a tapered energy pattern created by the optical device 18. In this embodiment the pattern is essentially star-shaped and the energy intensity is substantially constant in all parts of the pattern. The arms of the star taper in a radial outward direction to a point at the outward end. As with the second embodiment, the lengths of the arms in the cross are preferably equal to or greater than twice the distance separating each pair of photodiodes.

Figure 5:
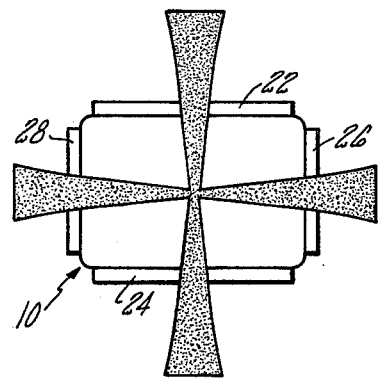
FIG. 5 is also similar to FIG. 2 but illustrates a constant intensity cross with reverse area taper.

Finally, referring to FIG. 5 there is seen a fourth embodiment of a tapered energy pattern according to the present invention. In this embodiment the energy intensity is essentially constant throughout the arms of the cross. However, the area of the cross increases in a radial outward direction from the center. In the same manner as with the second and third embodiments, the lengths of each of the arms of the cross are preferably equal to or greater than twice the distance separating the photodiodes of each pair. The optical device 18 which tapers the energy pattern directed toward the photodiode may be created by a number of different types of optical elements. Known devices would include lenses, axicons, holograms, apertures, masks, mirrors, filters or combinations thereof, or any other diffractive, refractive, reflective, or attenuating type of devices. Also it may be attached to the front of the emitter 12 in a single package or it may be separately mounted on the helmet 16. The exact optical elements employed may vary with the particular tapered energy pattern as heretofore described. For example, if the first embodiment of a tapered energy pattern as shown in FIG. 2 is desired, then a simple lens could be employed as the optical device 18 which might be conveniently mounted directly on the front of the emitter 12. If the second through the fourth embodiments of a tapered energy pattern are described as shown in FIGS. 3-5, this pattern could be formed by two lenses and a mask. The first lens would direct the beam toward a location at which the mask would be fixedly mounted. The second lens would be on the opposite side of the mask and would converge the energy toward the display.

In the embodiment illustrated in FIG. 1, it was heretofore described that a visible reticle image was generated along the axis 15 by a holographic device. It should be understood that numerous other type of optical apparatus are known which are capable of creating such reticle images and the use of another such reticle generating device would be one of design choice. Furthermore, in the preferred embodiment the reticle is presented to the viewer as a virtual image which has no real existence at the plane of the display 10. An alternate configuration is possible in which the reticle is produced as a real image at the display plane. Such a configuration would also allow the tapered energy pattern and the reticle image to be identical, thus combining the functions of emitter 12 with the source 56, and of the optical device 18 with the hologram 58.

Figure 6:
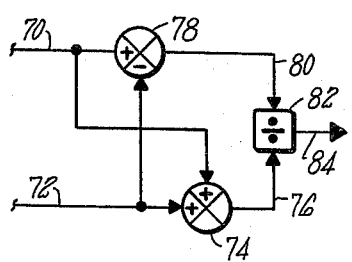
FIG. 6 is a schematic diagram of one embodiment of the normalizer circuit depicted in FIG. 1.

Referring now to FIG. 6, there is illustrated one embodiment of either normalizer circuit as shown in FIG. 1, this circuit being used in both the vertical and horizontal channels to compensate for the unintentional variations in intensity of the beam of electromagnetic energy incident on the faceplate. Such variations can result from a number of different causes, e.g. dirt accumulating on the optical elements, power supply fluctuations in the remote source, smoke or other airborne pollution between the remote source and the faceplate, or thermal variations. The basic technique is called "monopulse processing" and is generally known to those of ordinary skill. As shown, the input signals from each opposite pair of photodiodes are presented to the normalizer circuit via lines 70 and 72 and are fed to a summing junction 74 providing a signal on line 76 equivalent to the sum thereof. The input signals are also presented to a subtracting junction 78 providing a signal on line 84 equivalent to the difference between the input signals. The sum and difference signals are presented to separate inputs of an analog divider 82. The analog output divider 82 provides an output signal on line 84 which is defined by the expression:

$$V_{70} - V_{72}/V_{70} + V_{72}$$

Accordingly, the output signal on the line 84 has a magnitude which is proportional to the difference in the electromagnetic energy intensity received by each orthogonal pair of photoresponsive elements scaled by the composite sum of the received electromagnetic energy from both the photodetectors.

Figure 7:
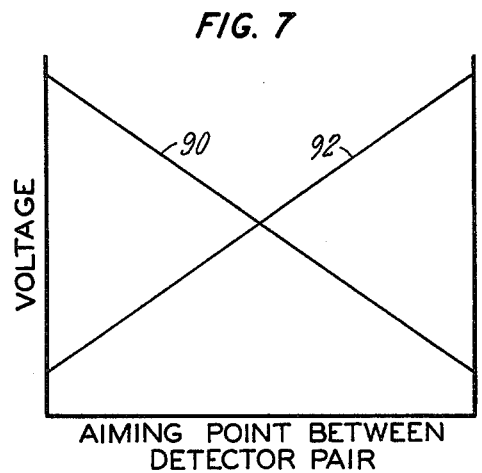
FIG. 7 is a graph illustrating the electrical response of the output signals from one pair of photodiodes as a function of the point therebetween inpinged by the incident beam.

Referring additionally to FIG. 7, there is seen a graphic illustration of the voltage gradients on the lines 70 and 72 of FIG. 6, these representing the filtered outputs from one pair of photoresponsive elements plotted with respect to the point on the faceplate of the display 10 struck by the incident beam. As shown, the gradient 90 represents the variation of one input to one normalizer circuit while the gradient 92 represents the variation on the other input to the normalizer circuit. Although in the depicted situation, the gradients are essentially linear, it should be understood that in the normal condition such a gradient would most likely be somewhat nonlinear, but continuous and monotonic. As will be appreciated by those of ordinary skill, as the pilot moves his head forward or away from the display 10, the slope of the gradient lines 90 and 92 will change causing the excursion of magnitudes of the input signals to the normalizer for different faceplate locations to change. However, by combining the signals in the manner heretofore described, the magnitude of the output signal on the line 84 will be substantially identical for any intensity of the incident beam.

While in the present embodiment the beam of electromagnetic energy is divided along a separate axis from the axis of the visible reticle image, it should be understood that the two axes could be combined into a single axis. For example, in FIG. 1 a beam splitter can be located in front of the pilot's eye to redirect the energy from the source 12 along the axis 15 toward the display 10.

Although the invention has been shown and described with respect to the preferred embodiment thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. Aiming point locator for identifying the point on a plane which is viewed by a wearer, comprising:
    emitter means positionable on the head of a wearer for selectively directing a beam of electromagnetic energy along a first axis toward a plane;
    optical means located adjacent said emitter means through which said beam of electromagnetic energy passes for modifying said beam to create a tapered energy pattern;
    sighting means positionable on the head of said wearer for creating a visible image along a second axis, said second axis intersecting said first axis, to identify the intersection of said first axis with said plane; and photoresponsive means for receiving said tapered beam of electromagnetic energy from said emitter means and for providing an electrical output signal which is related to the location of the point in said plane viewed by said wearer.

2. An aiming point locator according to claim 1, wherein said photoresponsive means includes at least one pair of photodiodes positioned in a spaced configuration in said plane viewed by said wearer, and wherein said optical means tapers said beam of electromagnetic energy by converging the intensity thereof along said first axis.

3. An aiming point locator according to claim 2, wherein said photoresponsive means includes two pair of photodiodes positioned in an orthogonal configuration, and wherein said optical means tapers said beam of electromagnetic energy uniformly in intensity in all directions forming a circular intensity gradient about the point where said first axis intersects said plane.

4. An aiming point locator according to claim 1, wherein said photoresponsive means comprises at least one pair of photodiodes positioned in a spaced configuration in said plane being viewed by said wearer, and wherein said optical means tapers said beam of electromagnetic energy to form a band which is sized to be at least twice as long as the distance separating said photodiodes in said plane.

5. An aiming point locator according to claim 4, wherein said band of electromagnetic energy formed by optical means is tapered in area such that its width is thickest at its midportion and thinnest at its outward ends.

6. An aiming point locator according to claim 4, wherein said band of electromagnetic energy formed by said optical means is tapered in area such that its width is thinnest at its midportion and thickest at its outward end.

7. An aiming point locator according to claim 1, wherein said photoresponsive means comprises two pairs of photodiodes oriented in an orthogonal configuration, the photodiodes of each pair being spaced apart, and wherein said optical means tapers said beam of electromagnetic energy in orthogonal directions from two distinct energy bands, each band being sized to twice as long as the distance separating each pair of photodiodes.

8. Any point locator according to claim 1, further including a switch means having a first stage which renders said sighting means operable to create a visible image along said second axis, and a second stage which renders said emitter means operable so that said photoresponsive means provides an electrical output signal indicative of the location viewed by said wearer.

9. Aiming point locator according to claim 1, further including a normalizer circuit coupled to said photoresponsive means.

10. Aiming point locator according to claim 9, wherein said normalizer circuit comprises a summing node, a subtracting node, and an analog divider having a pair of inputs, and wherein said photoresponsive means is electrically coupled to said summing node and said subtracting node and wherein said summing node supplies an electrical signal to one input of said analog divider which is proportional to the sum of the signal supplied thereto, and wherein said subtracting node supplies a signal to the other input of said analog divider whose magnitude is proportional to the difference of the signals presented thereto.

11. Aiming point locator according to claim 1, wherein said sighting means for creating a visible image includes a hologram positioned along said second axis.

* * * * *

UNITED STATES PATENT AND TRADEMARK OFFICE
CERTIFICATE OF CORRECTION

PATENT NO. : 4,209,255
DATED : June 24, 1980
INVENTOR(S) : Hans A. Heynau and Peter E. Raber It is certified that error appears in the above—identified patent and that said Letters Patent are hereby corrected as shown below:

Column 1, line 21, "3,971,412" should read -- 3,917,412 --

Signed and Sealed this

Sixteenth Day of September 1980

[SEAL]

Attest:

SIDNEY A. DIAMOND

Attesting Officer

Commissioner of Patents and Trademarks